(No Model.) 2 Sheets—Sheet 1.
I. F. STUDEBAKER.
SEEDER.
No. 575,863. Patented Jan. 26, 1897.
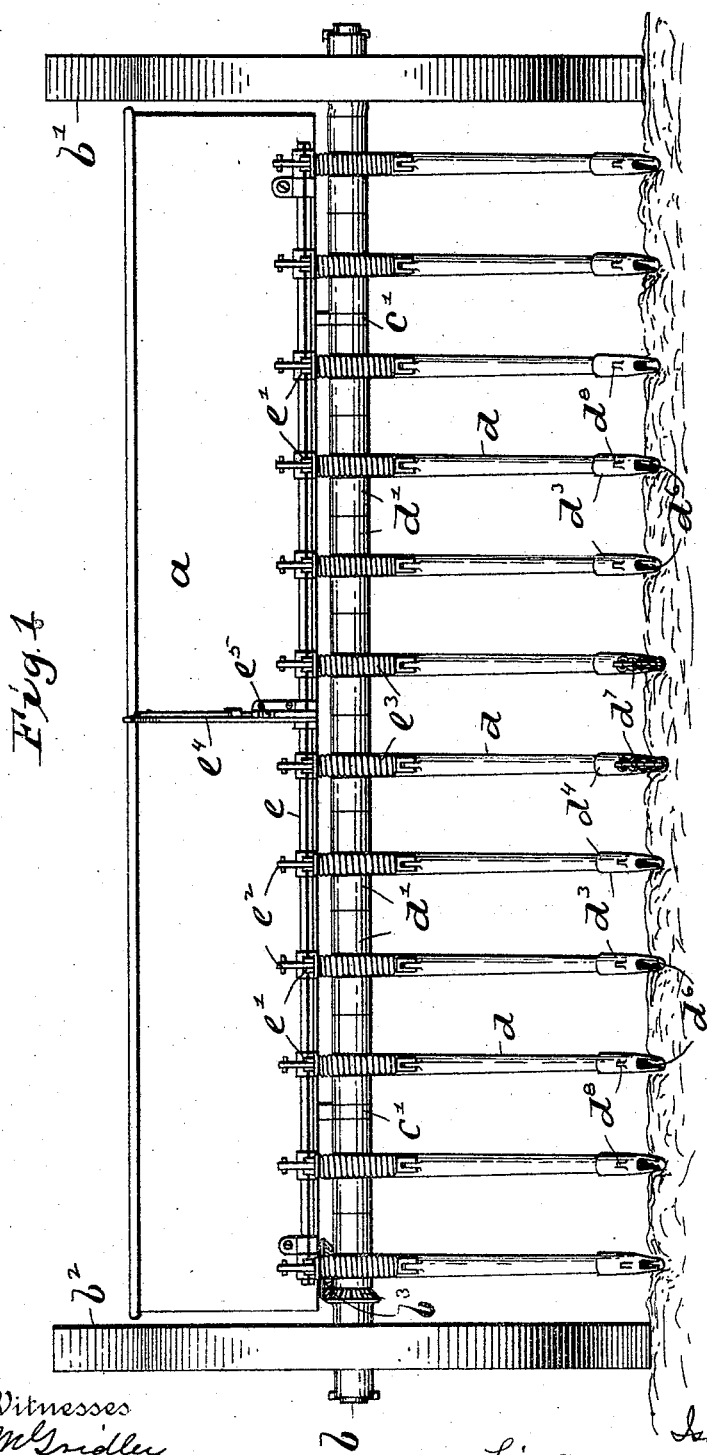
Witnesses
G. McGridley
Chas. I. Welch
Inventor
Isaac F. Studebaker
By his Attorney (No Model.) 2 Sheets—Sheet 2.
I. F. STUDEBAKER.
SEEDER.
No. 575,863. Patented Jan. 26, 1897.
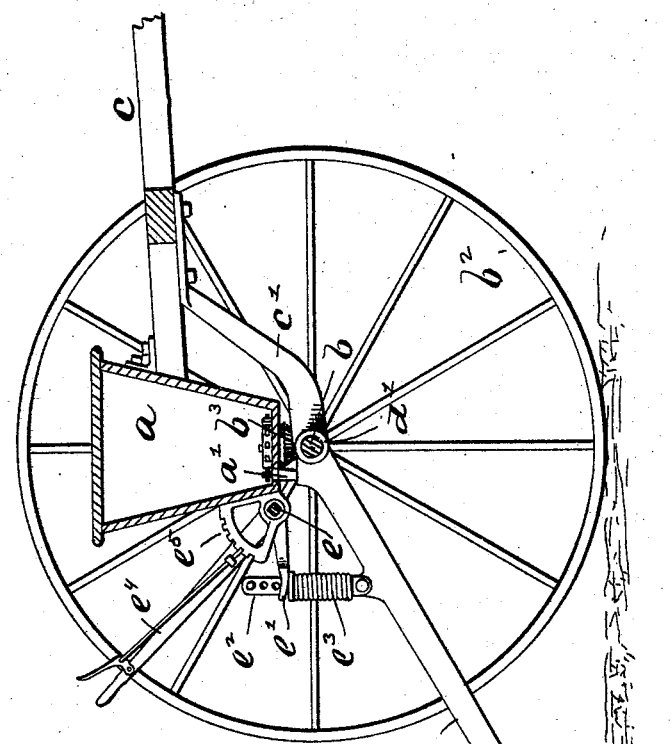
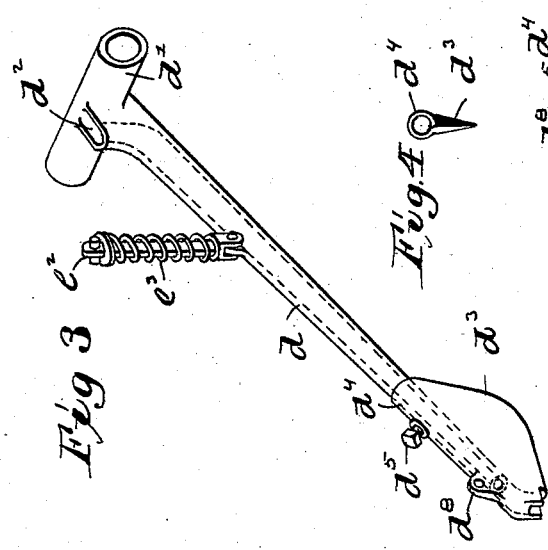
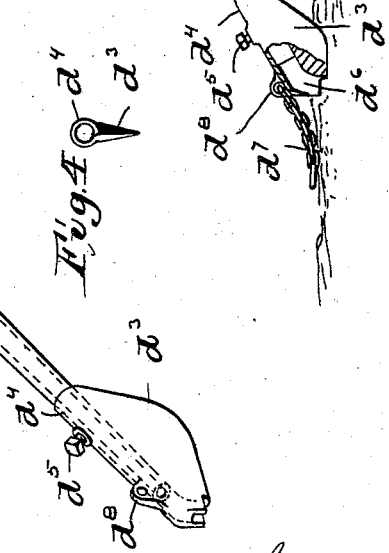
Witnesses
G. M. Gridley
Chas. I. Welch
Inventor
Isaac F. Studebaker
By his Attorney

UNITED STATES PATENT OFFICE.

ISAAC F. STUDEBAKER, OF TIPPECANOE CITY, OHIO.

SEEDER.

SPECIFICATION forming part of Letters Patent No. 575,863, dated January 26, 1897.

Application filed August 17, 1896. Serial No. 602,974. (No model.)

*To all whom it may concern:*

Be it known that I, ISAAC F. STUDEBAKER, a citizen of the United States, residing at Tippecanoe City, in the county of Miami and State of Ohio, have invented certain new and useful Improvements in Seeders, of which the following is a specification.

My invention relates to improvements in seeders; and the object of my invention is to provide a seeding device especially adapted for sowing clover and similar seeds.

My invention consists in the various constructions and combinations of parts hereinafter described, and set forth in the claims.

In the accompanying drawings, Figure 1 is a rear elevation of a machine embodying my invention. Fig. 2 is a transverse sectional view of the same. Fig. 3 is a detail view of one of the seed-conduits; and Fig. 4 is a front view of the furrow-opening device, forming a part of said conduit.

Like parts are represented by similar letters of reference in the several views.

In seeding for clover and similar products great difficulty has been experienced in obtaining a stand by the devices now employed. Seeds like clover are usually sown at the same time with wheat or similar cereals, but as the season is usually disastrous to the seed when sown at the same time with winter wheat it is quite common to seed the clover in the spring after the wheat has sprouted, and, as the seeding must be done without interfering with the wheat, broadcast seeders are usually employed; but the method of seeding with the ordinary broadcast seeders, unless attended with favorable conditions of weather, &c., will not produce good results, as the seed does not properly germinate.

By my invention I provide a machine which is adapted to sow clover and similar seed in fields in which wheat or other cereals have already been rooted, the constructions being such that the seed will be deposited properly in the ground, so as to germinate and become rooted, while at the same time the seeding will not interfere with the crop already planted and germinated.

In my improved machine I employ a hopper $a$, in which any suitable device may be employed. To this hopper is secured a stationary axle $b$, on which the wheels $b'$ $b^2$ are adapted to travel and one or both of which may be employed with suitable gears $b^3$ to drive the seeding devices. The shaft or tongue $c$ to which the motive power is applied is connected directly to the hopper $a$ and axle $b$, as shown, a suitable connecting-brace $c'$ being employed for this purpose, so that the hopper and axle form the frame of the machine, no other frame being required.

From each of the seed-distributing devices there extends backwardly a conduit $d$, which is formed at the front with a transverse sleeve $d'$, adapted to fit and turn on the axle $b$. This conduit $d$ is hollow throughout its length and is provided near the sleeve $d'$ with an inlet-opening $d^2$, into which the discharge $a'$ of the distributer is adapted to enter. The conduit $d$ extends backwardly and downwardly and is provided with a furrow-opening device $d^3$, which is preferably formed at the top with a sleeve-shaped portion $d^4$, adapted to fit over the outlet of the conduit $d$ and be secured thereon by a set-screw $d^5$, or some fastening device, so as to be removable. This furrow-opening device is also hollow, and is provided at the rear with a downwardly-extending groove or channel $d^6$, which leads to the bottom edge of said furrow-opening device.

Any suitable covering means may be employed for placing the dirt into the furrow after the seed is sown, an ordinary drag-chain $d^7$, connected to a suitable lug $d^8$ on the furrow-opener, being shown for this purpose.

Means may be provided for raising and lowering the furrow-openers and applying pressure thereto. I have shown a rock-shaft $e$, having projecting fingers $e'$, adapted to engage with stirrups $e^2$, having springs $e^3$ thereon for this purpose, the rock-shaft having connected thereto a hand-lever $e^4$ and a suitable ratchet-stand $e^5$ for holding the same in different positions of adjustment.

In operation the machine is driven across the field in which the wheat or other cereal is rooted, say in the spring, the wheat having been planted in the fall previous. The furrow-openers $d^4$ are formed sharp at the front, and, being small and light, cut through the wheat-rows without interfering with the same and deposit the seed sown into said furrows. The conduit being formed with the longitudinal lateral opening and having the laterallyarranged sleeve serves at once as a support for the furrow-opener and a conduit for the seed, and also as a drag-bar for said furrow-opener, the constructions being thus reduced to the simplest possible character.

Having thus described my invention, I claim—

1. The combination with the frame, a hopper, and a stationary shaft in said frame, carrying-wheels on the ends of said shaft, of a series of backwardly-extending conduits, each of said conduits being formed with laterally-extending bearings to fit on said shaft, and a lateral opening in proximity to said bearings, and a removable furrow-opener at the other end of said conduit, substantially as specified.

2. The combination with the hopper and an axle, carrying-wheels supporting said axle, of a series of conduits having a laterally-extending sleeve journaled on said axle with the ends of the sleeves of adjacent conduits in contact as described, a lateral opening in each of said conduits in proximity to said sleeve, and a detachable furrow-opener at the opposite end of said conduit from said sleeve, substantially as specified.

3. The combination with the frame and hopper, an axle supporting said frame, and carrying-wheels supporting said axle, a distributer in said hopper, and a conduit pivoted directly on said axle and provided with a lateral opening connected to said distributer, a furrow-opener on the opposite end of said conduit, and an intermediate lug or projection on said conduit, and a yielding connection from said lug or projection to a raising and lowering device, substantially as specified.

4. The combination with the hopper, an axle secured thereto, a distributer in said hopper, a pivoted conduit having laterally-extended bearings to fit on said axle, a lateral opening in one side of said conduit in proximity to said bearings, and a detachable furrow-opener having a sleeve adapted to fit over the end of said conduit, said furrow-opener being formed with a grain-channel at the rear end thereof extending downwardly from said sleeve, substantially as and for the purpose specified.

In testimony whereof I have hereunto set my hand this 12th day of August, A. D. 1896.

ISAAC F. STUDEBAKER.

Witnesses:
J. A. KERR,
ESTA S. SMITH.